Patented Nov. 26, 1946

2,411,578

UNITED STATES PATENT OFFICE 2,411,578

CONDENSATION PRODUCTS AND METHODS OF PREPARING SAME

Eugene Lieber, West New Brighton, Staten Island, and Marvin E. Thorner, Brooklyn, N. Y., assignors to Standard Oil Development Company, a corporation of Delaware No Drawing. Application November 15, 1941, Serial No. 419,314

16 Claims. (Cl. 260—671)

This invention relates to a novel type of chemical condensation products and to methods of preparing such products and using them for various purposes, more particularly as pour depressors in waxy lubricating oils.

It is known that pour depressors can be made by condensing an aromatic compound, such as naphthalene with an aliphatic compound, but it has always heretofore been considered necessary to use relatively long chain or high molecular weight aliphatic compounds, such as chlorinated paraffin wax or corresponding olefins, for such condensation.

One object of the present invention is to avoid the use of such long-chain aliphatic compounds, and another object is to use aliphatic compounds which are saturated in respect to hydrogen (i. e., free from olefinic linkages) and yet do not contain any reactive halogen atoms as are present in chlorinated paraffin wax.

Broadly, the invention comprises the production of condensation products having wax-modifying properties, by chemically condensing a lower saturated aliphatic ether with an aromatic compound. This condensation is preferably carried out by the use of a Friedel-Crafts catalyst according to the procedure commonly used for effecting such condensations.

The lower saturated aliphatic ether to be used is one having a low molecular weight and a low number of carbon atoms. Although some modified ethers may be used, it is preferred to use ethers having the general formula R—O—R', where R and R' are like or unlike alkyl groups and where the total number of carbon atoms in R and R' together is less than 10, and preferably less than 7 carbon atoms. Specific examples of such ethers include dimethyl ether, di-ethyl ether, dipropyl ether, di-isopropyl ether, di-secondary butyl ether, methyl isopropyl ether, isopropyl tertiary butyl ether, etc., or mixtures of two or more such pure compounds, or commercial products of which such ethers represent the main constituent.

The aromatic compound to be used as the other reactant may be composed of a single aromatic ring or polynuclear compounds, and in the latter case the several nuclei may be separate or condensed. Various derivatives of such aromatic compounds may also be used, such as those containing alkyl, hydroxy, amino, and other substituents, or partially hydrogenated aromatic compounds, so long as these various derivatives still contain at least two replaceable hydrogen atoms on the nucleus, or, in other words, so long as they are still subject to Friedel-Crafts condensation. Specific examples of suitable aromatic compounds include benzene, naphthalene, anthracene, phenanthrene, toluene, xylene, amyl benzene, retene, phenol, alpha- or beta-naphthol, cresol, anisole, tertiary amyl phenol, diphenyl, and diphenyl oxide.

The Friedel-Crafts catalyst to be used in effecting this condensation of the lower aliphatic ether with the aromatic compound, according to this invention, is preferably anhydrous aluminum chloride, although other Friedel-Crafts catalysts can be used, such as boron fluoride, ferric chloride, titanium tetrachloride, boron trichloride, antimony chloride, zinc chloride, and in some cases even hydrogen fluoride.

The proportions of reactants to be used should be about ⅕ to 5 mols, preferably ½ to 2 mols, of lower aliphatic ether to 1 mol of aromatic compound and the amount of catalyst should be, for instance in the case of aluminum chloride, about ½ to 4 mols, preferably 1–3 mols per mol of aromatic compound.

The use of an inert diluent or solvent, especially one which is a good solvent for the resulting high molecular weight condensation product, is optional but is preferred, and if used, should be present in about ½ to 10 volumes, preferably 1–5 volumes, per volume of total reactants and catalyst.

In carrying out the invention, the operating conditions to be used should include a temperature between the approximate limits of room temperature and 300° F., preferably mixing the reactants and catalyst at about room temperature and then after any initial reaction has begun to subside, heating the reaction mixture to a final temperature of about 150–250° F., with a reaction time of about ½ to 10 hours, usually about 1 to 5 hours. The reactants and catalyst can be mixed in any desired order, for instance, the aliphatic ether and the aromatic compound can be mixed together first, with or without solvent, and then the catalyst added, or the catalyst may be mixed with the aromatic compound, and then the aliphatic ether subsequently added.

After the reactants and catalyst have been mixed together and after the reaction mixture has been heated to the desired final temperature for a sufficient time to complete the reaction, the reaction mixture is then cooled, diluted with a convenient volume of kerosene, light chlorinated hydrocarbon or other suitable diluent, and neutralized by any of the methods familiar to the Friedel-Crafts art, i. e., by adding water, alcohol, dilute aqueous caustic soda solution, etc., a mixture of alcohol and water being very suitable. The reaction mixture is then separated, as by settling, into two layers, the aqueous layer containing the aluminous sludge being removed, and the kerosene extract, after washing with water, is then distilled under reduced pressure, i. e., with fire and steam or with vacuum (e. g. 5-50 mm. mercury at absolute pressure) to a temperature of about 500° or 600° F. to remove solvent and low-boiling products. The distillation residue constitutes the desired condensation product of this invention.

This product generally has a consistency ranging from a viscous oil to a hard resin and has a color ranging from green to brown or black. This product is soluble in mineral oils, has a fairly high molecular weight, e. g., about 500 to 2,000, and has the property of modifying the crystal structure of waxes such as paraffin wax when added to compositions containing such wax. For instance, when about 0.5–10.0%, preferably about 1–5%, of this wax modifier is added to a waxy lubricating oil, such as a Pennsylvania or other paraffinic type lubricating oil having a relatively high pour point, the resultant blend will have a substantially lower pour point; this condensation product is therefore an effective pour depressor for waxy oils. A small amount of this wax modifier is also useful as a dewaxing aid for removing wax from mineral lubricating oils of undesirably high wax content, and if desired, this wax modifier may also be incorporated in similarly small amounts into paraffin wax or compositions containing the same to be used for various purposes, such as for coating or impregnating paper, etc., or for making various molded products.

Some of the condensation products of this invention also are good dyes, for instance having the property of imparting a green color to a mineral oil even though the condensation product itself may be a black, hard resin.

The invention will be better understood from a consideration of the following experimental data which are given for the sake of illustration but without intending to limit the invention to the particular materials or operating conditions used. For the sake of clearness the procedure used in carrying out the first experiment will be explained in detail, and for convenience and brevity, the kinds and amounts of materials, as well as operating conditions used in the other tests, will be indicated only in the summary table in which all of the test data are given. This table also shows the yield (weight) of product obtained and shows the A. S. T. M. pour point data obtained when the condensation products of this invention are tested in a 2% or 5% concentration in a waxy mineral lubricating oil base stock having a pour point of +30° F.

Example

Into a 3-liter-4-neck round bottom flask fitted with a mechanical stirrer, reflux condenser, thermometer and dropping funnel were placed 130 grams of di-sec. butyl ether, 128 g. of naphthalene and 500 cc. of kerosene (heavily treated with sulfuric acid before use) as solvent. Means were provided for cooling and heating the reaction flask. The mechanical stirrer was started and while maintaining a temperature of 60° F., 300 g. of anhydrous $AlCl_3$ were slowly added to the reaction mixture over a period of 45 minutes. After the addition of the $AlCl_3$ the reaction mixture was heated to 150° F., and maintained thereat for 4 hours, after which time it was diluted with a further quantity of kerosene, cooled to 100° F., and the $AlCl_3$ destroyed by slowly adding 500 cc. of water. After settling, the kerosene extract was washed free of acid and then distilled with fire and steam to 540° F., in order to remove solvent and low-boiling products. A bottoms residue comprising 147 grams of a green viscous oil was obtained as product. This was found to be freely soluble in lubricating oil in all proportions.

When 2% of this condensation product was added to a waxy oil, the pour point of which was +30° F., the pour point was found to be 0° F.

In all of the seven tests described in the following table, 300 g. of aluminum chloride were used, and in tests 1 and 2 the aluminum chloride was added last, whereas, in tests 3–7 the aluminum chloride, aromatic compound and solvent were first mixed together and then the ether was added last.

Table

| Test No. | Ether | | Aromatic compound | | Solvent (cc.) | | Temp., °F. | Time, hrs. | Yield, g. | Pour point, °F. | | |
|---|---|---|---|---|---|---|---|---|---|---|---|---|
| | Name | G. | Name | G. | Kerosene [1] | Tetrachlorethane | | | | 2% | 5% | |
| 1 | Di-sec. butyl | 130 | Naphthalene | 128 | 500 | | 150 | 4 | 147 | 0 | | Green viscous oil. |
| 2 | do | 130 | do | 128 | | 500 | 150 | 4 | 78 | +5 | | Black resin. |
| 3 | Di-isopropyl | [2] 102 | do | 128 | | 500 | 200 | 3 | 116 | | 0 | Black resin (green dye). |
| 4 | do | [2] 102 | Benzene | 78 | | 500 | 200 | 3 | 43 | | 0 | Black resin, hard. |
| 5 | Di-sec. butyl | [2] 130 | Naphthalene | 128 | 500 | | 200 | 3 | 107 | 0 | −10 | Brown resin. |
| 6 | Di-isopropyl | [2] 50 | Retene | 100 | | 500 | 200 | 3 | 120 | 0 | 0 | Brown resin, hard. |
| 7 | do | [2] 50 | Diphenyl | 100 | | 500 | 200 | 3 | 110 | −5 | | Brown resin. |

[1] Made inert by heavy pretreatment with $H_2SO_4$.
[2] Added last.

The above table shows that by the Friedel-Crafts condensation of lower saturated aliphatic ethers with aromatic compounds, high boiling condensation products are produced which have pour-depressing properties, i. e., in 2% concentration they reduce the pour point of a waxy lubricating oil base stock from +30° F. to about 0° F., or even lower. It should also be noted that the condensation product of test 3 was a good green dye for mineral oils.

It is not intended that this invention be limited to any of the specific examples which were given merely for the sake of illustration but only by the appended claims in which it is intended to claim all novelty inherent in the invention as well as equivalents coming within the scope and spirit of the invention.

Lubricating compositions, e. g. comprising a major proportion of waxy mineral lubricating oil, containing the novel condensation products described herein, are claimed in copending application Serial No. 554,344, filed September 15, 1944.

We claim:

1. The process which comprises condensing about 1/5 to 5 mols of an ether having the general formula R—O—R', in which R and R' are alkyl groups having a total of less than 10 carbon atoms, with about 1 mol of an aromatic compound, in the presence of about 1/2 to 4 mols of a Friedel-Crafts catalyst and in the presence of about 1/2 to 10 volumes of inert solvent per volume of total reactants and catalyst, at a temperature between the approximate limits of room temperature and about 300° F., hydrolyzing and removing the catalyst and distilling the condensation products under reduced pressure to a temperature of at least 500° F. to obtain as distillation residue a high molecular weight condensation product soluble in mineral oil.

2. The process which comprises condensing about 1/2 to 2 mols of an ether having the general formula R—O—R', where R and R' are alkyl groups having a total of less than 7 carbon atoms with about 1 mol of aromatic compound in the presence of about 1 to 3 mols of aluminum chloride and in the presence of 1 to 5 volumes of inert solvent per volume of reactants and catalyst, said reactants and catalyst being mixed at about room temperature, and then heating to a final reaction temperature of 150–250° F. for a reaction time of 1/2 to 10 hours, hydrolyzing and removing the catalyst and distilling the condensation product with fire and steam distillation to at least about 500° F. to obtain as distillation residue a high molecular weight condensation product soluble in mineral oils and having wax-modifying properties.

3. The process which comprises condensing about 1/2 to 2 mols of di-isopropyl ether with about 1 mol of aromatic hydrocarbon in the presence of about 1 to 3 mols of aluminum chloride and about 1 to 5 volumes of solvent per volume of mixed reactants and catalyst, at a temperature between about room temperature and about 300° F., hydrolyzing and removing the catalyst and distilling the condensation product with fire and steam to a temperature of at least about 500° F. to obtain as distillation residue a condensation product soluble in mineral oil and having pour-depressing properties.

4. A Friedel-Crafts condensation product of a lower dialkyl ether and an aromatic compound, said condensation product having a molecular weight of about 500 to 2,000, being substantially non-volatile up to about 500° F. under reduced pressure.

5. A condensation product of a dialkyl ether having less than 10 carbon atoms and an aromatic compound, said condensation product having a molecular weight of about 500 to 2,000 being soluble in mineral oil and substantially non-volatile at temperatures up to about 500° F.

6. A condensation product of an ether having the general formula R—O—R', where R and R' are alkyl groups having a total of less than 10 carbon atoms, with an aromatic compound selected from the group consisting of aromatic hydrocarbons and alkyl, hydroxy, amino and partially hydrogenated derivatives thereof, said condensation product having a molecular weight of about 500 to 2,000 being soluble in mineral oil and substantially non-volatile at temperatures up to about 500° F. under reduced pressure.

7. An aluminum-chloride condensation product of di-isopropyl ether and naphthalene, said condensation product having a molecular weight of about 500 to 2,000 being soluble in mineral oil, substantially non-volatile at temperatures up to about 500° F. under fire and steam distillation, and having the property of reducing the pour point of waxy mineral oils when added thereto in small amounts.

8. Process according to claim 2 in which the inert solvent is a refined kerosene.

9. Process according to claim 2 in which the inert solvent is tetrachlorethane.

10. Process according to claim 2 in which about 500 cc. of inert solvent are used for each gram mol of aromatic compound.

11. Product according to claim 6 having the property of reducing the pour point of a waxy mineral lubricating oil having a pour point of +30° F. down to at least about 0 when added thereto in 2% concentration.

12. Product according to claim 7 being a green dye for mineral oils.

13. Process according to claim 2 in which the aromatic compound used is naphthalene.

14. Process according to claim 3 in which the aromatic hydrocarbon used is naphthalene.

15. The process which comprises chemically condensing a halogen free lower dialkyl ether with an aromatic compound in the presence of a substantial amount of inert solvent and a Friedel-Crafts catalyst at a temperature between the approximate limits of room temperature and about 300° F., to produce a condensation product non-volatile at 500° F., under reduced pressure, hydrolyzing and removing the catalyst, and distilling the reaction product under reduced pressure to a temperature of at least 500° F., to obtain the desired high molecular weight condensation product as distillation residue.

16. The process which comprises condensing a dialkyl ether having less than 10 carbon atoms with an aromatic compound selected from the group consisting of aromatic hydrocarbons and alkyl, hydroxy amino and partially hydrogenated derivative thereof, in the presence of a Friedel-Crafts catalyst and in the presence of a substantial amount of inert aliphatic organic solvent at a temperature between the approximate limits of room temperature and about 300° F., to produce a condensation product non-volatile at 500° F., under reduced pressure to a temperature of at least 500° F., to obtain the desired high molecular weight condensation product as distillation residue.

EUGENE LIEBER.
MARVIN E. THORNER.